United States Patent [19]

Kusumoto et al.

[11] 4,284,887

[45] Aug. 18, 1981

[54] POLYCHROMATIC X-RAY SOURCE FOR DIFFRACTION APPARATUS USING POLYCHROMATIC X-RAYS

[75] Inventors: Sho Kusumoto; Yoshio Fukuda, both of Hitachi; Sadao Nemoto, Hitachiota; Naoki Sakurama, Hitachi, all of Japan

[73] Assignee: Hitachi, Ltd., Tokyo, Japan

[21] Appl. No.: 16,829

[22] Filed: Mar. 2, 1979

[30] Foreign Application Priority Data

Mar. 16, 1978 [JP] Japan ................................ 53/29253

[51] Int. Cl.[3] ........................ G01N 23/20; G21K 1/00

[52] U.S. Cl. .................................... 250/272; 250/496

[58] Field of Search ............... 250/272, 273, 280, 274, 250/277 CH, 496, 498, 493, 497, 503, 275, 277 R, 278, 279

[56] References Cited

U.S. PATENT DOCUMENTS

| | | | |
|---|---|---|---|
| 3,448,264 | 6/1969 | Rhodes | 250/272 |
| 4,128,762 | 12/1978 | Nagao et al. | 250/272 |

*Primary Examiner*—Alfred E. Smith
*Assistant Examiner*—Thomas P. O'Hare
*Attorney, Agent, or Firm*—Thomas E. Beall, Jr.

[57] ABSTRACT

There is provided polychromatic X-ray source used in a polychromatic X-ray diffraction apparatus, in which polychromatic X-rays are cast upon a sample to be analyzed, the energies of the X-rays diffracted from the crystallographic planes of the sample are measured and the physical properties of the sample are detected on the basis of the measured energies. The polychromatic X-ray source has a container made of radiation shielding material and having an X-ray outlet channel and the container contains therein a radionuclide for emitting radioactive rays and a substance for scattering and absorbing the radioactive rays emitted from the substance so as to obtain polychromatic X-rays. The polychromatic X-rays emitted from the substance travel through the X-ray outlet channel and are then made parallel through a Soller slit to be cast upon the sample. A slide door is provided in the channel so as to block the polychromatic X-rays if necessary.

28 Claims, 6 Drawing Figures

POLYCHROMATIC X-RAY SOURCE FOR DIFFRACTION APPARATUS USING POLYCHROMATIC X-RAYS

This invention relates to a polychromatic X-ray source used in an X-ray diffraction apparatus and more particularly to a polychromatic X-ray source in which $\gamma$-rays emitted from a radioactive nuclide are converted to polychromatic X-rays and in which the polychromatic X-rays are collimated into a bundle of parallel X-rays that is to be cast on an object to be measured.

A typical example of the polychromatic X-ray diffraction apparatus is a stress measuring apparatus using polychromatic X-rays (hereafter referred to for convenience' sake as a polychromatic X-ray stress measuring apparatus). The operating principle of the polychromatic X-ray stress measuring apparatus is as follows. Polychromatic X-rays are cast on a polycrystalline object to be measured. The X-rays diffracted from the crystallographic planes of the object are detected so that the energies of the detected X-rays may be measured to obtain the information about the distribution of the stresses applied to the object or about fatigue damage caused in the object after the repeated application of stresses thereto. Such a polychromatic X-ray stress measuring apparatus is disclosed in, for example, the specification of the U.S. Pat. No. 4,128,762 issued on Dec. 5, 1978.

Such a polychromatic X-ray stress measuring device usually uses an X-ray tube as its polychromatic X-ray source. The well-known X-ray tube must be furnished with a vacuum pump for evacuating the X-ray tube, a stable high voltage source or transformer having a large capacity and used for generating X-rays, and a cooling apparatus for cooling the X-ray tube. Accordingly, the currently used polychromatic X-ray source is considerably voluminous, heavy and expensive, and moreover a polychromatic X-ray diffraction apparatus using such a polychromatic X-ray source will be of large size and need a lot of time before it is ready for use in measurement.

It is therefore one object of this invention to provide a polychromatic X-ray source for use in a polychromatic X-ray diffraction apparatus having a small size, which needs a very short time for the preparation of use for measurement and can dispense with a stable high voltage source or transformer, a vacuum pump and a cooling equipment.

Another object of this invention is to provide a new polychromatic X-ray source for a polychromatic X-ray diffraction apparatus, in which the polychromatic X-rays are derived from the $\gamma$-rays emitted from a radioactive nuclide.

Figure 1:
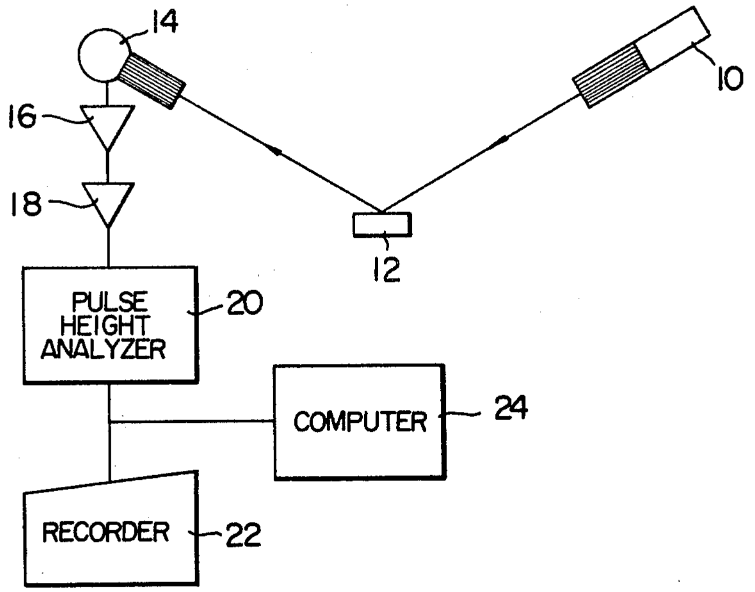

The above and other objects and features of this invention will be apparent when one reads the following detailed description of this invention with the aid of the attached drawings, in which:

FIG. 1 schematically shows a block diagram of a polychromatic X-ray stress measuring apparatus according to this invention; and FIGS. 2 to 6 show in cross section the structures of polychromatic X-ray sources as different embodiments of this invention.

FIG. 1 shows in block diagram a polychromatic X-ray stress measuring apparatus as a typical example of a polychromatic X-ray diffraction apparatus embodying this invention. A polychromatic X-ray source 10 contains therein a radioactive nuclide which emits $\gamma$-rays that are converted to polychromatic X-rays to be cast upon an object 12 subjected to measurement. The polychromatic X-rays cast on the object 12 are reflected from the crystallographic planes in the object 12, as diffracted X-rays in various directions. A semiconductor detector 14 fixed at a point for detecting X-rays receives only those components of the diffracted X-rays which have a wavelength satisfying Bragg's condition. The detected signal is amplified by a preamplifier 16 and a linear amplifier 18 and the amplified signal is sent to a multi-channel pulse height analyzer 20, which obtains the energy distribution of the incident X-rays through pulse height analysis. The energy distribution thus obtained is recorded by a recorder 22 or further analyzed by a computer to obtain the stresses or fatigue damage in the object 12.

Figure 2:
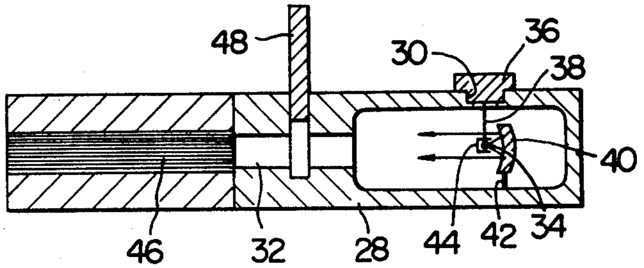

FIG. 2 shows in cross section a polychromatic X-ray source for use in such a polychromatic X-ray diffraction apparatus as described above. In FIG. 2, a container 28, made of radiation shielding material such as lead, has an opening 30 through which a radioactive nuclide is put in or out and a radiation outlet duct 32. A radionuclide 34 is supported on a plug 36 by means of a supporting member 38. The plug 36 can be tightly fitted into the opening 30 so that the radionuclide 34 is placed rigidly in a fixed position in the container 28. A radiation reflector 40 formed of a heavy metal, such as gold or tungsten in the shape of a concave mirror is attached to the container 28 by means of a supporting member 42. The radionuclide 34, when set in place, is located at a focal point of the concave mirror reflector 40. The radionuclide 34 is also enclosed by a radiation shielding or reflecting substance 44, except in the direction pointing toward the reflector 40. As the radionuclide 34 is used an $\gamma$-ray emitter such as a radioisotope of rhodium, americium or thulium. The $\gamma$-rays emitted from the radionuclide 34 are reflected by the reflector 40 and directed as almost parallel beams toward the outlet duct 32. The incident angles of the $\gamma$-rays onto the reflector 40 vary with the distance from the center of the reflector 40 to the point of incidence so that the $\gamma$-rays subjected to Compton scattering with the atoms of the reflector 40 are converted to polychromatic X-rays having a wide range of wavelengths longer than those of the original $\gamma$-rays. The polychromatic X-rays are guided through the outlet duct 32 into a Soller slit 46, which forms the incident X-rays parallel. For example, the $\gamma$-rays emitted from americium $^{241}$Am have a typical energy peak of about 0.06 MeV and therefore polychromatic X-rays having an energy band of 5–40 KeV can be obtained through Compton scattering. The radioisotope of americium, i.e. $^{241}$Am, emits $\beta$-rays besides $\gamma$-rays. The $\beta$-rays are converted to polychromatic X-rays under the braking radiation phenomenon. The reflector 40 not only causes Compton scattering but also simply absorbs the radiation energy. Accordingly, the polychromatic X-rays reflected from the reflector 40 and directed toward the outlet channel 32 necessarily contain those X-rays which are obtained by simply absorbing and reflecting the braking radiation by the reflector 40. The thus produced polychromatic X-rays are caused to be a bundle of parallel beams through the Soller slit 46 and are cast upon the object to be measured. The radiation outlet duct 32 is provided also with a slide door 48 made of X-ray shielding substance such as lead. The polychromatic X-rays as parallel beams can be radiated or blocked by opening or closing the slide door 48. When the slide door 48 is closed, the radiation is sealed within the container 28 by the radiation absorbing material.

Figure 3:
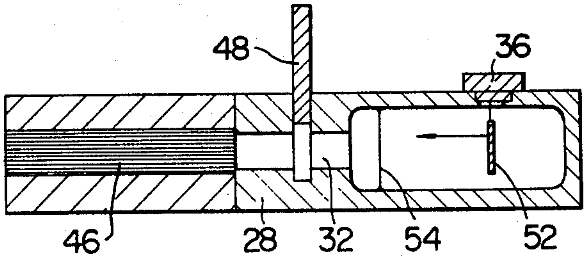

FIG. 3 shows in cross section a polychromatic X-ray source as another embodiment of this invention. A radioactive substance or radioisotope 52 is shaped into a disc so that the γ-rays emitted from the radiosiotope 52 may have a uniform intensity toward the Soller slit 46. A screen 54 made of such a substance as capable of causing Compton scattering with γ-rays, e.g. a heavy metal, such as gold or tungsten, is attached in the container 28 between the radioisotope 52 and the Soller slit 46 and preferably in the vicinity of the inner mouth of the radiation outlet duct 32.

In the polychromatic X-ray source shown in FIG. 3, the screen 54 for subjecting the γ-rays to Compton scattering is so thin that the number of scatterings is small. This structure therefore makes the source serve as a polychromatic X-ray source suitable for measurements which need X-rays having only a narrow range of energy levels. By varying the thickness of the screen 54, the range of the energy levels of the obtained X-rays can be selected.

Figure 4:
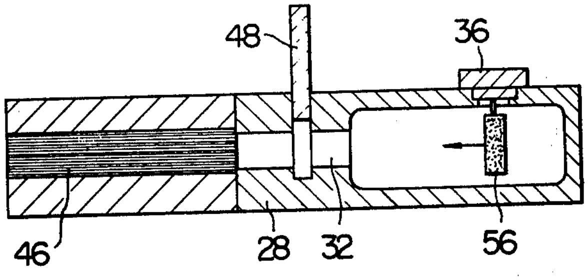

FIG. 4 shows in cross section a polychromatic X-ray source as a third embodiment of this invention. In FIG. 4, a γ-ray emitter 56 is a powdered radioisotope dispersed uniformly in a molded substance which can scatter γ-rays through Compton effect, e.g. a heavy metal, such as gold or tungsten. This embodiment is similar in effect to a structure in which a substance capable of scattering γ-rays through Compton effect is placed between a radioisotope and a Soller slit in the path of γ-rays.

In this embodiment, the obtained polychromatic X-rays have a very wide range of energy levels since the γ-rays emitted from different particles of the powdered radioisotope travel through different distances before they leave the outer surface of the molding substance.

This invention seems to have a problem that since a radioisotope is used as an X-ray source, the intensity of the radiation from the emitter may decrease with time. However, such a problem can be easily solved by using a radioisotope having a long half-life, e.g. americium $^{241}Am$ having a half-life of 458 years. If the time equal to 1/100 of the half-life (4.58 years in the case of $^{241}Am$) passes, the intensity of the radiation from the radioisotope will fall by a factor of about 0.01. This means that the change in the intensity of radiation from the source may be made smaller in the apparatus according to this invention than in the conventional apparatus using an X-ray tube.

Figure 5:
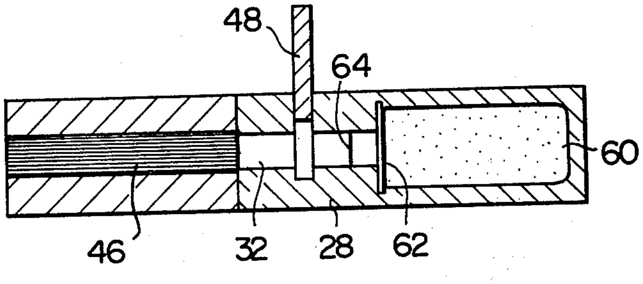

FIG. 5 shows a fourth embodiment of this invention, in which a radioisotope 60 is a gas such as krypton ($^{85}Kr$). The main space of the container 28 is filled with radioisotope gas 60 and the inner mouth of the radiation outlet duct 32 is sealed with a sealing member 62 having a small absorption coefficient for γ-rays so as to prevent the leakage of the gaseous isotope 60. The γ-rays emitted from the radioisotope 60 pass through the sealing member 62 and then are scattered and absorbed by a screen 64 made of suitable substance such as gold or tungsten, so as to be converted to polychromatic X-rays, which become parallel beams through the Soller slit 46 and leave the source. In case of krypton $^{85}Kr$, the braking radiation having intensities increasing with the decrease in energy levels predominate in the range of wavelengths corresponding to those of X-rays. Therefore, most of the polychromatic X-rays obtained through the screen 64 may result from the partial absorption of the braking radiation rather than from the Compton scattering of the γ-rays. The polychromatic X-rays in question should preferably have a uniform intensity over a wide range of wavelengths so that it is necessary to suitably choose the material and the thickness of the screen 64. When krypton gas is used as radioisotope, aluminum foil is suitable as such a screen to obtain polychromatic X-rays having a flat intensity characteristic. For the absorption coefficient of aluminum for γ-rays increases with the decrease in the energy level of the incident γ-rays. The aluminum foil may be replaced by other metal foils such as tin foil etc. However, since such metal foils other than aluminum have a γ-ray absorption coefficient rapidly increasing with the decrease in the energy level of the incident γ-rays, a flat characteristic can hardly be obtained.

Figure 6:
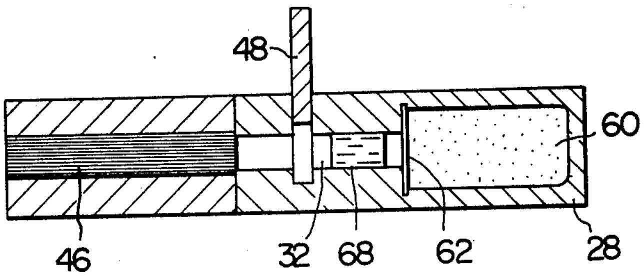

FIG. 6 shows a fifth embodiment of this invention, in which the scattering material such as a heavy metal is a layer of gas or liquid. In this case, the layer 68 of gas or liquid must have a greater thickness than the metal foil, as shown in FIG. 6, since it has a smaller absorption coefficient for γ-rays than the metal foil. Also, in this case, since the degree of increase in the absorption coefficient for γ-rays of gas or liquid with the decrease in the energy level of the incident γ-rays is smaller than that of metal and since the change in the absorption coefficient with the change in the energy level is represented by a linear function, they γ-rays having lower energy levels predominate.

In the above embodiments, the scattering material for γ-rays is a substance of a single element. However, this is not a restriction to this invention. For example, a composite scattering member consisting of several elements in the form of alloy or a combination of discrete plates, can be used to make the intensity of the obtained X-rays uniform over a wide range of wavelengths.

As described above, according to this invention, a polychromatic X-ray source can be obtained which is smaller in size, lighter and less expensive than a conventional polychromatic X-ray source using an X-ray tube equipped with a stable high voltage source or transformer, a vacuum pump and a cooling apparatus. Moreover, according to this invention, the polychromatic X-rays can be cast and cut off by simply opening and closing a sliding door so that there is no special time required before the source becomes ready for use in measurement. Further, polychromatic X-rays having a desired range of energy levels and a desired intensity characteristic can be obtained by suitably selecting radioisotopes as γ-ray emitters and materials for γ-ray scatterers. In addition to these merits, the present invention facilitates the analysis of an object having a complicated shape or a large size through the diffraction of polychromatic X-rays.

What we claim is:

1. A polychromatic X-ray source used in a polychromatic X-ray diffraction apparatus, in which polychromatic X-rays are cast along a beam path upon a sample to be analyzed, the energies of the X-rays diffracted from the crystallographic planes of said sample are measured and the physical properties of said sample are detected on the basis of the measured energies, said polychromatic X-ray source comprising:

- a container made of radiation shielding material and having an X-ray outlet channel through which the beam path passes;

a radionuclide contained in said container so as to emit radioactive primary rays;

target means mounted in said container so as to intercept the emitted rays from said radionuclide and thereby emit polychromatic secondary X-rays into said channel by acattering and absorbing said primary rays emitted from said radionuclide, said target means being a substance that scatters said radioactive primary rays emitted from said radionuclide through a Compton effect to produce polychromatic X-rays;

radiation shielding means for opening and closing said channel to the passage of rays traveling along said beam path toward said sample; and Soller slit means in said beam path disposed in the vicinity of the outer end of said channel for collimating said polychromatic secondary X-rays along said beam path.

2. A polychromatic X-ray source used in a polychromatic X-ray diffraction apparatus, as claimed in claim 1, wherein said target means is a reflector for radiation and has a concave reflecting surface.

3. A polychromatic X-ray source used in a polychromatic X-ray diffraction apparatus, as claimed in claim 2, wherein said concave reflecting surface is shaped to define a focal point and said radionuclide is located at the focal point of said concave reflecting surface of said reflector.

4. A polychromatic X-ray source used in a polychromatic X-ray diffraction apparatus, as claimed in claim 1, wherein said radionuclide has a flat surface perpendicular to said beam path and the axis of said channel, said target means being a substance in the form of a screen placed between said radionuclide and said channel so that the radioactive primary rays emitted from said flat surface of said radionuclide are sent through said substance toward the outer end of said channel.

5. A polychromatic X-ray source used in a polychromatic X-ray diffracting apparatus, as claimed in claim 1, wherein said radionuclide is powdered and mixed in said target means so as to be uniformly distributed throughout said target means.

6. A polychromatic X-ray source used in a polychromatic X-ray diffraction apparatus, as claimed in claim 3, wherein said radiation shielding means includes a slide guide extending through said container generally perpendicularly across said channel and a door of radiation shielding material slidably received within said channel for movement between a first position completely removed from said channel that will permit passage of radiation out of said container and a second position completely blocking said channel to radiation for preventing radiation from leaving said container.

7. A polychromatic X-ray source used in a polychromatic X-ray diffraction apparatus, as claimed in claim 6, wherein said radionuclide, target means, radiation shielding means, Soller slit means, and channel are all centered on a single axis; and wherein said container includes a passage extending from said channel outwardly, a plug of radiation shielding material mounted in said passage to prevent the escape of radiation through said passage, and a supporting member rigidly attached directly to said plug so as to extend into said channel and having said radionuclide fixed to its end opposite from said plug.

8. A polychromatic X-ray source used in a polychromatic X-ray diffraction apparatus, as claimed in claim 7, including means operatively associated with said container for holding the sample to be analyzed in said beam path;

semiconductor detector means operatively associated with said holding means and said container so as to intercept radiation reflected by the sample from said beam path and produce an electric output signal correlated to the strength of reflected radiation received; and means for amplifying said electric signal and means for receiving said amplified signal and producing a correlated visual output representative of the energy distribution.

9. A polychromatic X-ray source used in a polychromatic X-ray diffraction apparatus, as claimed in claim 3, wherein said radionuclide, target means, radiation shielding means, Soller slit means, and channel are all centered on a single axis; and wherein said container includes a passage extending from said channel outwardly, a plug of radiation shielding material mounted in said passage to prevent the escape of radiation through said passage, and a supporting member rigidly attached directly to said plug so as to extend into said channel and having said radionuclide fixed to its end opposite from said plug.

10. A polychromatic X-ray source used in a polychromatic X-ray diffraction apparatus, as claimed in claim 4, wherein said radiation shielding means includes a slide guide extending through said container generally perpendicularly across said channel and a door of radiation shielding material slidably received within said channel for movement between a first position completely removed from said channel that will permit passage of radiation out of said container and a second position completely blocking said channel to radiation for preventing radiation from leaving said container.

11. A polychromatic X-ray source used in a polychromatic X-ray diffraction apparatus, as claimed in claim 10, wherein said radionuclide, target means, radiation shielding means, Soller slit means, and channel are all centered on a single axis; and wherein said container includes a passage extending from said channel outwardly, a plug of radiation shielding material mounted in said passage to prevent the escape of radiation through said passage, and a supporting member rigidly attached directly to said plug so as to extend into said channel and having said radionuclide fixed to its end opposite from said plug.

12. A polychromatic X-ray source used in a polychromatic X-ray diffraction apparatus, as claimed in claim 11, including means operatively associated with said container for holding the sample to be analyzed in said beam path;

semiconductor detector means operatively associated with said holding means and said container so as to intercept radiation reflected by the sample from said beam path and produce an electric output signal correlated to the strength of reflected radiation received;

means for amplifying said electric signal and means for receiving said amplified signal and producing a correlated visual output representative of the energy distribution; and wherein said target means is a screen on said beam path between said radionuclide and said Soller slit.

13. A polychromatic X-ray source used in a polychromatic X-ray diffraction apparatus, as claimed in claim 4, wherein said radionuclide, target means, radiation shielding means, Soller slit means, and channel are all centered on a single axis;

wherein said container includes a passage extending from said channel outwardly, a plug of radiation shielding material mounted in said passage to prevent the escape of radiation through said passage, and a supporting member rigidly attached directly to said plug so as to extend into said channel and having said radionuclide fixed to its end opposite from said plug.

14. A polychromatic X-ray source used in a polychromatic X-ray diffraction apparatus, as claimed in claim 5, wherein said radiation shielding means includes a slide guide extending through said container generally perpendicularly across said channel and a door of radiation shielding material slidably received within said channel for movement between a first position completely removed from said channel that will permit passage of radiation out of said container and a second position completely blocking said channel to radiation for preventing radiation from leaving said container.

15. A polychromatic X-ray source used in a polychromatic X-ray diffraction apparatus, as claimed in claim 14, wherein said radionuclide, target means, radiation shielding means, Soller slit means, and channel are all centered on a single axis; and wherein said container includes a passage extending from said channel outwardly, a plug of radiation shielding material mounted in said passage to prevent the escape of radiation through said passage, and a supporting member rigidly attached directly to said plug so as to extend into said channel and having said radionuclide fixed to its end opposite from said plug.

16. A polychromatic X-ray source used in a polychromatic X-ray diffraction apparatus, as claimed in claim 15, including means operatively associated with said container for holding the sample to be analyzed in said beam path;

semiconductor detector means operatively associated with said holding means and said container so as to intercept radiation reflected by the sample from said beam path and produce an electric output signal correlated to the strength of reflected radiation received; and means for amplifying said electric signal and means for receiving said amplified signal and producing a correlated visual output representative of the energy distribution.

17. A polychromatic X-ray source used in a polychromatic X-ray diffraction apparatus, as claimed in claim 5, wherein said radionuclide, target means, radiation shielding means, Soller slit means, and channel are all centered on a single axis; and wherein said container includes a passage extending from said channel outwardly, a plug of radiation shielding material mounted in said passage to prevent the escape of radiation through said passage, and a supporting member rigidly attached directly to said plug so as to extend into said channel and having said radionuclide fixed to its end opposite from said plug.

18. A polychromatic X-ray source used in polychromatic X-ray diffraction apparatus, as claimed in claim 1, wherein said container includes a gas impermeable sealing member forming a sealed chamber within the innermost portion of said channel, and said radionuclide is a radioactive gas contained within said chamber.

19. A polychromatic X-ray source used in a polychromatic X-ray diffraction apparatus, as claimed in claim 18, wherein said target means is a liquid sealed within said container between said radioactive gas and said Soller slit.

20. A polychromatic X-ray source used in a polychromatic X-ray diffraction apparatus, as claimed in claim 19, wherein said radiation shielding means includes a slide guide extending through said container generally perpendicularly across said channel and a door of radiation shielding material slidably received within said channel for movement between a first position completely removed from said channel that will permit passage of radiation out of said container and a second position completely blocking said channel to radiation for preventing radiation from leaving said container.

21. A polychromatic X-ray source used in a polychromatic X-ray diffraction apparatus, as claimed in claim 20, wherein said radionuclide, target means, radiation shielding means, Soller slit means, and channel are all centered on a single axis; including means operatively associated with said container for holding the sample to be analyzed in said beam path;

semiconductor detector means operatively associated with said holding means and said container so as to intercept radiation reflected by the sample from said beam path and produce an electric output signal correlated to the strength of reflected radiation received; and means for amplifying said electric signal and means for receiving said amplified signal and producing a correlated visual output representative of the energy distribution.

22. A polychromatic X-ray source used in a polychromatic X-ray diffraction apparatus, as claimed in claim 18, wherein said radiation shielding means includes a slide guide extending through said container generally perpendicularly across said channel and a door of radiation shielding material slidably received within said channel for movement between a first position completely removed from said channel that will permit passage of radiation out of said container and a second positon completely blocking said channel to radiation for preventing radiation from leaving said container.

23. A polychromatic X-ray source used in a polychromatic X-ray diffraction apparatus, as claimed in claim 22, including means operatively associated with said container for holding the sample to be analyzed in said beam path;

semiconductor detector means operatively associated with said holding means and said container so as to intercept radiation reflected by the sample from said beam path and produce an electric output signal correlated to the strength of reflected radiation received;

means for amplyfying said electric signal and means for receiving said amplified signal and producing a correlated visual output representative of the energy distribution; and wherein said radionuclide, target means, radiation shielding means, Soller slit means, and channel are all centered on a single axis.

24. A polychromatic X-ray source used in a polychromatic X-ray diffraction apparatus, as claimed in claim 1, wherein said radiation shielding means includes a slide guide extending through said container generally perpendicularly across said channel and a door of radiation shielding material slidably received within said channel for movement between a first position completely removed from said channel that will permit passage of radiation out of said container and a second position completely blocking said channel to radiation for preventing radiation form leaving said container.

25. A polychromatic X-ray source used in a polychromatic X-ray diffraction apparatus, as claimed in claim 24, including means operatively associated with said container for holding the sample to be analyzed in said beam path;

semiconductor detector means operatively associated with said holding means and said container so as to intercept radiation reflected by the sample from said beam path and produce an electric output signal correlated to the strength of reflected radiation received;

means for amplifying said electric signal and means for receiving said amplified signal and producing a correlated visual output representative of the energy distribution; and wherein said radionuclide, target means, radiation shielding means, Soller slit means, and channel are all centered on a single axis.

26. A polychromatic X-ray source used in a polychromatic X-ray diffraction apparatus, as claimed in claim 25, wherein said container includes a passage extending from said channel outwardly, a plug of radiation shielding material removably mounted in said passage to prevent the escape of radiation through said passage, and a supporting member rigidly attached directly to said plug so as to extend into said channel and having said radionuclide fixed to its end opposite from said plug.

27. A polychromatic X-ray source used in a polychromatic X-ray diffraction apparatus, as claimed in claim 1, wherein said container includes a passage extending from said channel outwardly, a plug of radiation shielding material removably mounted in said passage to prevent the escape of radiation through said passage, and a supporting member rigidly attached directly to said plug so as to extend into said channel and having said radionuclide fixed to its end opposite from said plug.

28. A polychromatic X-ray source used in a polychromatic X-ray diffraction apparatus, as claimed in claim 1, including means operatively associated with said container for holding the sample to be analyzed in said beam path;

semiconductor detector means operatively associated with said holding means and said container so as to intercept radiation reflected by the sample from said beam path and produce an electric output signal correlated to the strength of reflected radiation received; and means for amplifying said electric signal and means for receiving said amplified signal and producing a correlated visual outout representative of the energy distribution.

* * * * *